Nov. 26, 1935.  A. P. DAVIS  2,022,275
DEVICE FOR INDICATING THE POSITION OF SHIPS
Filed Nov. 10, 1927  3 Sheets-Sheet 2
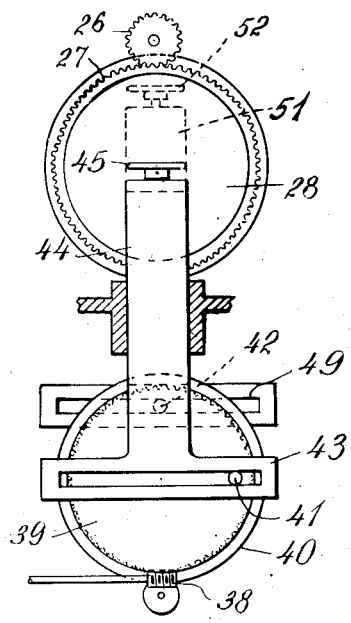
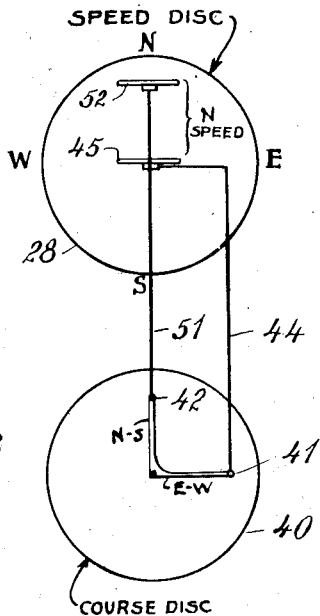
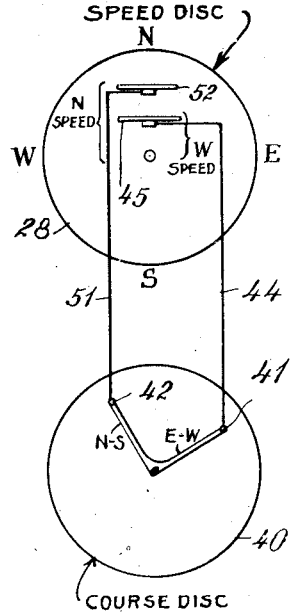
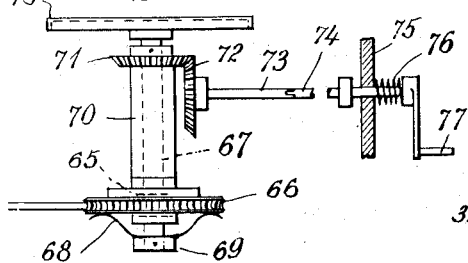
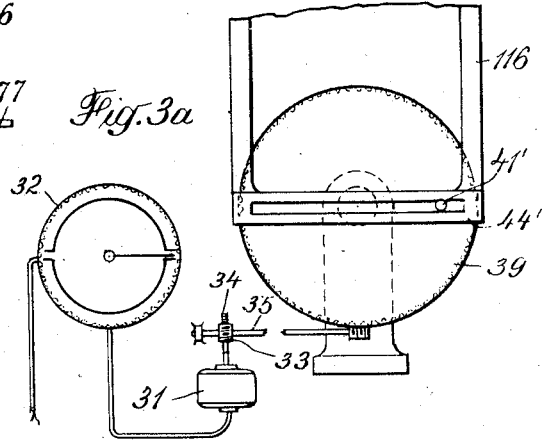
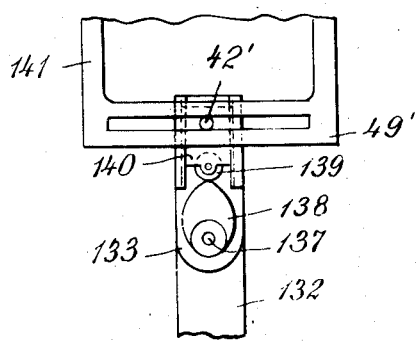
INVENTOR
Arthur P. Davis
BY
ATTORNEYS Nov. 26, 1935.  A. P. DAVIS  2,022,275

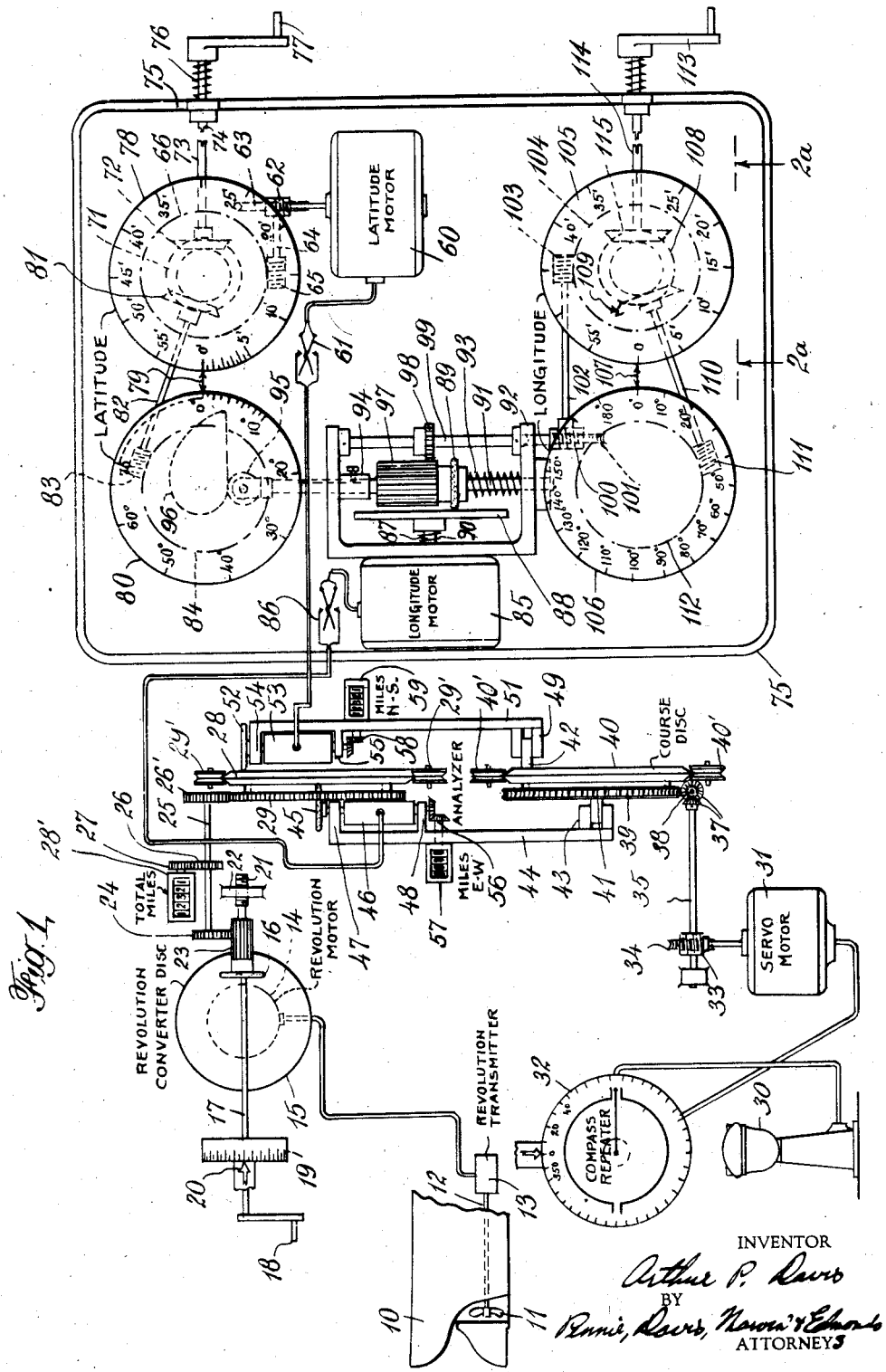

DEVICE FOR INDICATING THE POSITION OF SHIPS

Filed Nov. 10, 1927   3 Sheets-Sheet 3

INVENTOR
Arthur P. Davis
BY
ATTORNEYS

Patented Nov. 26, 1935

2,022,275

UNITED STATES PATENT OFFICE 2,022,275

DEVICE FOR INDICATING THE POSITION OF SHIPS

Arthur Pattison Davis, Brooklyn, N. Y., assignor of one-half to David M. Mahood, New York, N. Y.

Application November 10, 1927, Serial No. 232,324

12 Claims. (Cl. 235—61)

This invention relates to a device for indicating the instantaneous geographical position of a ship upon which the device is mounted without the necessity of resorting to astronomical observations, speed of ship readings, or the like. Dead reckoning of a ship is usually computed roughly from either log and compass readings, from propeller speed and compass readings, or from astronomical observations and compass readings. All of these well-known manual methods of dead reckoning are satisfactory but require determinable information of some kind before the computations can be made and this information is not always readily available. Furthermore, the procurement of this information is accompanied by unnecessary labor, requires special skill and is frequently difficult to obtain at times such as during heavy storms which often prevent accurate log or propeller speed readings, during overcast or foggy weather when it is impossible to make astronomical observations, and the like.

Apparatus has been devised heretofore whereby the equivalent log and compass movements are continuously reproduced and combined by vector mechanisms to trace the movements of the ship upon a chart or sphere. However, inasmuch as charts or spheres having the required superficial area would necessarily have to be of a prohibitive size in order to give fairly accurate readings, such apparatus is not practical. Other forms of dead reckoning apparatus employ a great number of local charts which must be continually changed and the apparatus readjusted when the ship moves out of the area defined by each one of the local charts. In addition to these objections, it is always necessary to calculate latitude and longitude inasmuch as the charts or spheres of such apparatus show only relative positions. These forms of apparatus are further inaccurate in that no provision is made for changes in longitude per miles traveled as the ship approaches or leaves the equator or the reversal in latitude readings as the ship crosses the equator, as well as the reversal of longitude readings as the ship crosses the Greenwich meridian.

It is the principal object of this invention to provide a device whereby the dead reckoning of the ship upon which the device is mounted is indicated instantaneously and automatically in degrees of latitude and longitude with an accuracy not heretofore obtainable. The input information consists of speed of ship and bearing of ship, and these may be obtained from the speed of propeller shaft and compass readings, respectively. The propeller speed readings and compass readings are mechanically converted into the resultant speeds of the ship in due N—S and E—W directions. These speed quantities are then converted into equivalent latitude and longitude readings which are readable from suitable dials placed in a convenient position upon the ship. Various factors of error are compensated for in order to give the accurate readings for every geographical position of the vessel. Such factors of error are those attributable to the vessel itself, such as drift, leeway, condition of the bottom, sea currents and the like; the correction in the longitude readings for the increase or decrease in miles per degree of latitude as the vessel approaches or leaves the equator; and the reversal in latitude readings as the vessel crosses from one side of the equator to the other. In the device of the present invention, the corrections in longitude are introduced automatically whenever the ship changes its latitude position, and inasmuch as a ship rarely travels for any length of time due east or west, the device introduces corrections substantially continuously.

For a better understanding of the invention, reference is made to the accompanying drawings Figure 1 is a schematic diagram of one form of the device of this invention;

Fig. 2 is a plan view of a portion thereof;

Fig. 2a is a detail of the hand setting mechanism;

Figs. 3, 3a and 3b are schematic diagrams of another form of the device of this invention; and Figs. 4 and 5 are diagrammatic illustrations of the operation of the device.

Figure 3:
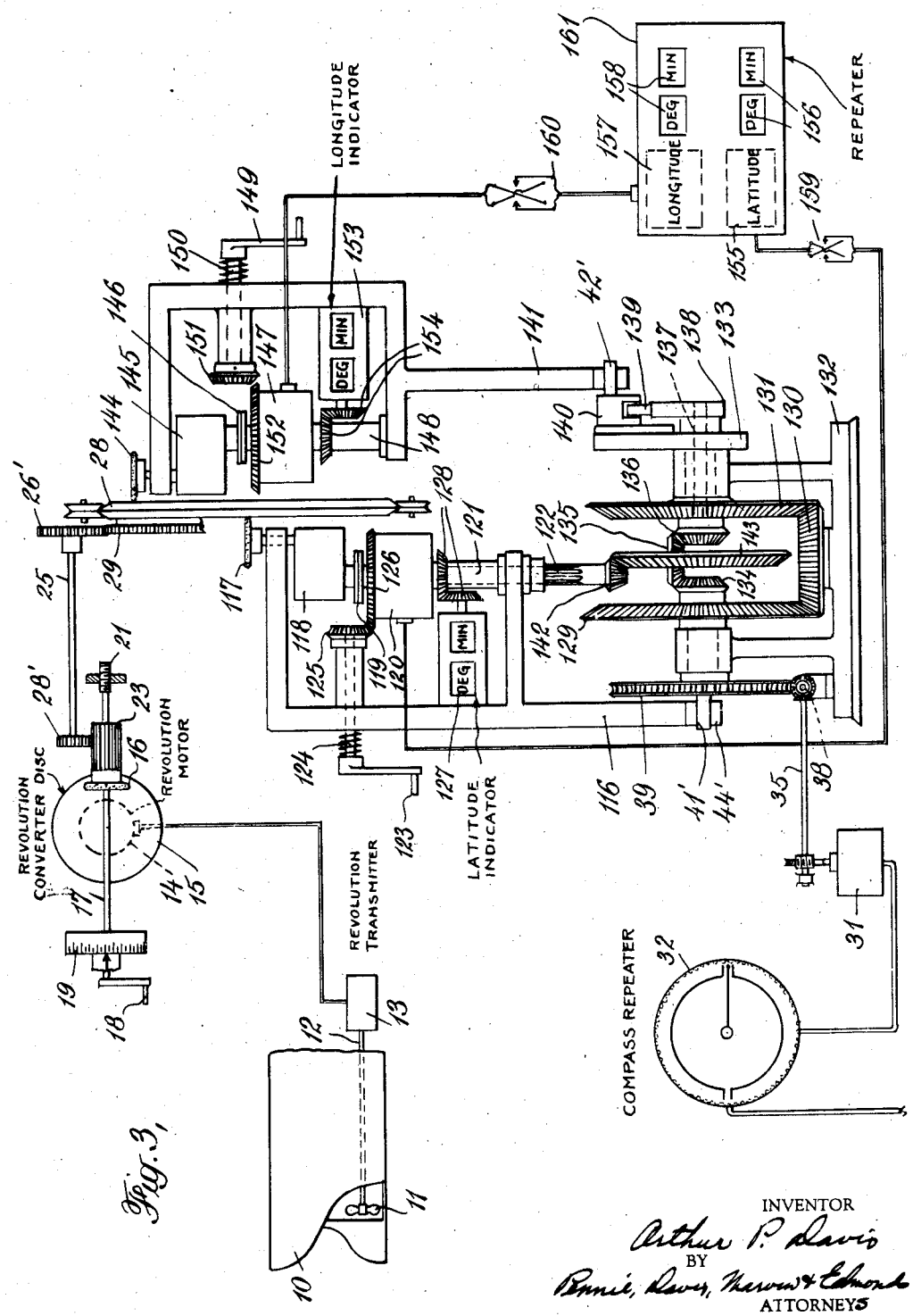

In these drawings numeral 10 designates the hull of a ship which is driven by propeller 11 attached to the propeller shaft 12. Connected to and driven by the propeller shaft 12 in any suitable manner is an electrical transmitter 13 which may be of the step by step type for driving a remote step by step receiver motor 14. This receiver motor in turn drives conversion disc 15 at the rate of revolution or some constant fraction of the rate of revolution of the propeller shaft. Engaging the surface of this disc so as to be driven thereby is a friction wheel 16 mounted upon a shaft 17, this shaft having a manually or automatically adjustable crank 18 and a dial 19 associated with a suitable index or lubber line 20. The relative radial position of friction wheel 16 on disc 15 determines the rate at which friction wheel 16 is driven, and for the purpose of changing the rate of rotation of friction wheel 16, the shaft 17 thereof is provided with a screw 21 which is threaded into a stationary nut block 22. Accordingly, in order to adjust the radial position of friction wheel 16 upon driving disc 15, crank 18 is rotated until suitably calibrated dial 19 indicates opposite lubber line 20 the proper correction reading, which reading corrects for factors of error incident to the operation of the vessel itself, such errors being caused by the condition of the hull of the vessel, drift, loss of efficiency of the propellers at high speed and for current and like conditions. The speed of friction wheel 16, which corresponds to the corrected rate of revolution of the propeller shaft or a predetermined ratio thereof, is transmitted therefrom by elongated pinion 23 which meshes with and is slidable in relation to gear 24. This gear 24 is mounted upon shaft 25 which is provided with a second gear 26 engaging the pinion 27 of odometer 28', which is calibrated to indicate total miles traveled. The opposite end of shaft 25 carries gear 26' which meshes with and drives a relatively large gear 29 securely attached to a plane disc 28 rotatably mounted in suitable bearing wheels 29' distributed at various points about its periphery. This disc 28 may be conveniently termed the speed disc, inasmuch as its rate of revolution bears a fixed relation to the speed of the ship, being driven through the correction mechanism above described from propeller shaft 12.

The course input of the dead reckoning device may be obtained from the master magnetic or gyroscopic compass 30 mounted in its binnacle in the usual position on the ship, the bearing of which is continuously transmitted by means of a suitable transmitting mechanism to a servo motor 31, which may conveniently be driven through one of the repeater compasses 32 frequently distributed in various portions of the vessel, such as in the master's cabin, or the like. As diagrammatically shown in Figure 1, the servo motor 31, by means of worm 33 and wheel 34, drives shaft 35. The opposite end of shaft 35 is provided with suitable beveled gears 37 which drive worm 38 and worm wheel 39 carrying and driving plane disc 40 which is rotatably mounted in suitable bearing wheels 40' distributed about its periphery in the same manner as was described in connection with speed disc 28. Inasmuch as the rotation of disc 40 depends upon the movement of the master compass 30 as it designates changes in the course of the vessel, disc 40 may be termed the course disc. The opposite sides of course disc 40 are provided with crank pins 41 and 42 disposed 90° apart. A cross head 43 is provided with a vertically extending bar 44 and an elongated horizontal slot in which pin 41 moves in a lateral direction as it rotates to drive bar 44 in a vertical direction. The free end of bar 44 carries a friction roller 45 in suitable journals for rotation with respect thereto. This friction roller 45 engages one surface of speed disc 28 and drives a transmitter 46, which may be of the step by step type and suitably secured between brackets 47 and 48 attached to the bar 44. Crank pin 42 is engaged by cross head 49, the slot of which embraces pin 42 so that the latter has free lateral motion therein. Mounted on cross head 49 is a bar 51, the free end of which carries friction roller 52 which engages and is driven by the other surface of speed disc 28. Connected to and driven by friction roller 52 is an electrical transmitter 53 suitably mounted between brackets 54 and 55 attached to vertical bar 51. Connected to the transmitter 46 through beveled gears 56, so as to be driven by the transmitter is an odometer 57 while transmitter 53 through beveled gears 58 drives odometer 59.

Transmitter 53 is connected to and drives electrical receiver motor 60, which may be disposed at a distance from transmitter 53 and which is reversible in direction of rotation by reversing switch 61. The shaft of receiver motor 60 carries worm 62 which drives worm wheel 63 and attached shaft 64 having a worm 65. As shown also in Fig. 2a this worm 65 drives worm wheel 66 which is freely rotatable upon shaft 67 15 except for a frictional drive connection procured by spring 68 engaging the surface of wheel 66 and attached by button 69 to shaft 67. Shaft 67 is journalled in bearing 70 and also carries bevel gear 71 which meshes with, so as to be rotatable by, bevel gear 72 on shaft 73. The free end of shaft 73 is provided with half of a clutch jaw or the like, which is adapted to be engaged by the corresponding clutch jaw on shaft 74 which is journalled so as to be axially slidable through the side of casing 75. Shaft 74 is surrounded by spring 76 which normally keeps the clutch open except when crank 77 is pushed inwardly. Accordingly, by pushing on and rotating crank 77, shaft 67 may be rotated relatively to driving worm wheel 66 because of the slippage between this wheel and spring 68. The upper end of shaft 67 carries dial 78 which is calibrated to indicate minutes of latitude against lubber line 79. A coacting dial 80, calibrated in degrees of latitude, is driven at a slower rate of speed than dial 78, and therefrom by means of bevel gear 81 meshing with bevel gear 71, shaft 82, worm 83 and worm wheel 84 which is connected to dial 80. The aforesaid calibration of latitude dials 78 and 80 is based upon the N—S co-ordinate of movement of the ship over the face of the globe, which is measurable in miles as described, each mile of movement of the ship in the N—S direction representing a certain fraction of a degree of latitude. Accordingly, the latitudinal position of the ship is directly proportional to the number of miles travelled by the ship in a due N—S direction since the ship's position, though varying, is definitely ascertainable as it travels. Thus the movement of latitude dial 78 is proportional to the due N—S movement of the ship, which is represented in the apparatus of this invention by the movements of friction wheel 52, transmitter 53 and receiver 60, so that dial 78 may be calibrated according to the latitude N—S miles proportionality for indicating latitude directly.

Transmitter 46 is connected to and drives electrical receiver motor 85 disposed in casing 75, and which is reversible in direction of rotation by reversing switch 86. The shaft 87 of motor 85 carries friction disc 88 which is pressed against friction wheel 89 by spring 90, so as to frictionally drive wheel 89. Friction wheel 89 is rotatable on shaft 91 which is journalled for axial movement in frame 92. One end of shaft 91 carries coil spring 93 which presses against and steadies wheel 89 in position on disc 88, while the other end of the shaft is splined on stud 94 against rotational movement, and carries wheel 95 which engages cam 96 carried by dial 80. Accordingly as cam 96 is rotated with dial 80, shaft 91 is moved axially and with it friction wheel 89. As the radial position of friction wheel 89 is varied upon disc 88, the speed of the wheel is changed. The rotation of wheel 89 is transmitted by integral pinion 97 to meshing pinion 98 secured on shaft 99 having a worm 100 which meshes with and drives worm wheel 101, attached shaft 102, worm 103, worm wheel 104 and attached dial 105. This dial is divided by calibration in the manner described in connection with latitude dial 78 for indicating minutes of longitude and coacts with dial 106 divided into degrees of longitude and lubber line 107. Dial 106 is driven at less speed than dial 105 and therefrom by means of bevel gears 108 and 109, shaft 110, worm 111, and wheel 112 which is attached to dial 106. Dials 105 and 106 are hand adjustable by means of crank 113, clutch shaft 114 and bevel gear 115 meshing with gear 108, through a frictional drive such as that described in connection with latitude setting crank 77.

The operation of the device may be explained in connection with Figs. 4 and 5. In Fig. 4 is illustrated the relation of crank pins 41 and 42 when the ship is heading due north, crank pin 42 representing the locus of N—S coordinates, and crank pin 41 the locus of the E—W coordinates. In the position illustrated in Fig. 4, pin 41 by means of bar 44, fixes the position of friction wheel 45 at the center of speed disc 28 so that no rotation is imparted to it since the ship is travelling neither east nor west. Crank pin 42 on the other hand, through bar 51, fixes the position of friction wheel 52 at the point near the periphery of the speed disc 28 where it receives rotation at a rate equivalent to the actual speed of the vessel which is moving in a due northerly course. Assume now that the vessel changes its course to a north north-west general direction. The master compass 30, through repeater 32 and servo-motor 31, will effect the rotation of course disc 40, so that the relative positions of crank pins 41 and 42 will be as illustrated in Fig. 5, and friction wheels 45 and 52 respectively, will be moved into equivalent relative positions so as to rotate at speeds representing the speed of the ship in northerly and westerly directions, respectively, the actual ship speed being the resultant of these two speeds. If the ship maintains this course, friction wheels 45 and 52 will maintain their same relative positions on speed disc 28.

The speeds of friction wheels 45 and 52 are reproduced within casing 75 by longitude and latitude receiver motors 85 and 60, respectively. The latitude dials 80 and 78 are directly actuated by motor 60 and continuously indicate in degrees and minutes, respectively, the latitude of the ship. Inasmuch as latitude is a direct function of miles travelled north or south, the latitude readings are directly proportional to the speed of the ship as it moves toward or leaves the equator. It may be noted here that there is a change in latitude near the poles due to the flattened polar surfaces, but ordinary navigation does not extend further than 70° latitude, so that this latitude correction need not be considered and the latitude dials are calibrated for not more than 70° latitude.

Inasmuch as a degree of longitude varies in miles according to latitude, which may be illustrated graphically by the convergence of the meridians toward the poles, a continual change in miles per degree of longitude results as the latitude changes, aside from the normal change in position of the ship. Actually, the length of a degree of longitude varies as the cosine of latitude, being, for example 69.65 statute miles at the equator, and 53.43 statute miles at 40° latitude. This source of error must be compensated for and as it varies as the cosine of latitude, cosine cam 96, driven according to the changes in latitude as indicated by connected dial 80, introduces a correction factor into the longitude indicating mechanism. This is done by the shifting of the radial position of friction wheel 89 upon drive disc 88. Inasmuch as the movement of cam 96 as the ship leaves the equator results in an increase in speed in the longitude indicating mechanism, the increase in degrees of longitude per miles traveled north or south is compensated for automatically.

Inasmuch as the latitude readings reverse upon opposite sides of the equator, switch 61 is manipulated to reverse the terminals of latitude receiver motor 60 so that it will then rotate in the reverse direction. Similarly, when the ship crosses the Greenwich meridian the longitude readings will reverse, and this is accomplished by reversing switch 86 of longitude receiver motor 85. As these occurrences of crossing the equator or zero meridian are usually rare, the reversal of the receiver motors may be done manually without inconvenience.

In Figs. 3, 3a and 3b is illustrated a modified form of a ship position indicating device of this invention in which the longitude corrections are introduced directly into the conversion mechanism including the crank device, instead of by separate mechanism at the indicating station as shown in Fig. 1. In this modified mechanism, the receivers for longitude and latitude indicate the correct readings directly at one or more points remote from the computing machanism. The input mechanisms are the same as those shown in Figure 1, these being so connected as to drive speed disc 28 and ships course worm wheel 39. Course worm wheel 39 carries E—W crank pin 41' which moves in cross head 44' so as to actuate frame 116. This frame carries friction roller 117 which engages and is driven by speed disc 28. The movement of friction wheel 117 is transmitted through reduction gearing 118, friction clutch 119 to transmitter 120 and shaft 121, which is hollow and carries a second shaft 122 which is splined therein. In order to initially adjust for latitude, the crank 123 is provided which is mounted on shaft 124, the opposite end of which carries beveled gear 125. This beveled gear by pushing inwardly on crank 123 may be caused to mesh with beveled gear 126 fixed to shaft 121. Accordingly by rotating crank 123, motion may be transmitted to transmitter 120 and shaft 121 through the slippage of friction clutch 119 without disturbing the relation between friction wheel 117 and speed disc 28. An indicator 127 which may be in the form of an odometer calibrated in the manner described to read in degrees and minutes of latitude is directly connected to shaft 121 by means of bevel gears 128.

The movement of course worm wheel 39 which is actuated by a remote master compass or the like is transmitted to bevel gears 129, 130 and 131, mounted in a suitable stationary bracket 132. Connected to bevel gear 131 so as to be driven thereby, is a crank 133 which carries crank pin 42'. The relation of crank pin 42' to crank pin 41' is different from that described in connection with Figure 1, in that the crank pins are not fixed 90° apart but rotate in opposite directions with respect to each other, but the effect remains the same. The movement of bevel gear 129 is transmitted to attached bevel gear 134 and intermeshing bevel gears 135 and 136, the latter being mounted on an independent shaft 137 projecting through crank 133. This shaft 137 carries cosine cam 138 which engages roller 139 mounted in slide 140 which directly carries crank pin 42', this crank pin being slidably in cross head 49' which carries and accordingly actuates frame 141. If the vessel is moving due east or west, there will be no change in latitude so that cosine cam 138 and crank 133 will remain stationary without relative movement between them. However, if the latitude is changing, bevel gear 142 carried by latitude shaft 122 imparts bodily movement to bevel gear 135 through attached bevel gear 143. This movement causes bevel gear 135 to roll around on relatively fixed bevel gear 134, and to rotate bevel gear 136, which is mounted upon shaft 137 carrying the cosine cam 138, and causes a displacement of cam 138 relative to crank 133. Consequently the crank arm of crank pin 42' is varied with a corresponding change in the position of frame 141 which is driven by crank pin 42' through cross head 49'.

The longitude computing mechanism is mounted upon frame 141 and carries friction wheel 144 which is driven by speed disc 28. The movement of friction wheel 144 is transmitted through reduction gearing 145, friction clutch 146, and transmitter 147 to shaft 148 which is suitably journalled in frame 141. In order to introduce corrections or originally set the longitude apparatus, a crank 149 mounted on shaft 150 is provided. By pushing inwardly upon crank 149, bevel gears 151 and 152 are caused to mesh and then by turning crank 149, the angular position of shaft 148 may be varied through the slippage of friction clutch 145 without disturbing the relation between friction wheel 144 and speed disc 28. A longitude indicator 153 suitably calibrated in the manner described to indicate degrees and minutes of longitude is connected to shaft 148 through bevel gears 154.

The latitude transmitter is connected to and drives remote latitude receiver 155 which actuates latitude dials 156 which are calibrated in the manner described to indicate the latitude in degrees and minutes. Similarly, the longitude transmitter 147 is connected to and directly drives longitude receiver 157 which actuates longitude dials 158 calibrated in the manner described to indicate degrees and minutes. In order to compensate for the reversal in latitude readings when the ship crosses the equator, a heart-shaped cosine cam 138 may be provided and the reversing switch 159 is placed in the transmission line connecting the latitude transmitter and receiver for the purpose of reversing the terminals of the latter so that it will indicate in reverse readings. Similarly a reversing switch 160 is placed in a longitude transmission line for reversing longitude readings as the ship crosses the Greenwich meridian. The longitude and latitude receiving motors 157 and 155, respectively, may be conveniently mounted in an instrument casing 161 and placed in any desirable position in the ship. If more than one of these instruments are required in different places in the ship, they may be connected to the longitude and latitude transmission lines in the form of repeaters in any well known manner.

In the device illustrated in Fig. 3, the throw of the longitude crank pin 42' is varied according to the cosine law as the ship approaches or leaves the equator, this variation being a function of latitude and is controlled by the movements of the latitude computing mechanism which is directly connected to friction wheel 117 disposed upon speed disc 28. This correction is effected by varying the relative position of friction wheel 144 upon speed disc 28. Accordingly, as latitude increases the speed of friction wheel 144 is increased since the double cosine cam 138 is actuated to increase the radial distance between friction wheel 144 and the center of speed disc 28. The reverse is true as the ship approaches the equator with the corresponding decrease in latitude readings.

It will be seen that the new device is capable of directly indicating dead reckoning of a ship without making any manual calculations whatever, and with an accuracy not heretofore obtainable since no charts or spheres are depended upon nor the human element of calculation. Accordingly, by merely glancing at the latitude and longitude dials of the new device, the exact geographical location of the ship upon which the device is mounted is instantaneously apparent at any time. Inasmuch as the input values of propeller speed and compass readings are direct and not dependent upon natural conditions, the device will read as accurately in heavy storms, fogs or during other adverse weather conditions.

I claim:

1. A device for continuously indicating the position of a ship, comprising a disc rotated in proportion to the ship's speed, members controlled by the ship compass and relatively movable on the surface of the disc so as to be driven thereby, said members being adjustable in proportion to the E—W and N—S components of the ship course, a longitude indicator operated by the E—W member, a latitude indicator operated by the N—S member, a cam operated by the latitude indicator, and connections between the cam and the longitude indicator for modifying the longitude readings.

2. A device for continuously indicating the position of a ship, comprising a disc rotated in proportion to the ship's speed, a crank controlled by the ship compass in proportion to the E—W component of the ship course, a second crank controlled by the ship compass in proportion to the N—S component of ship course, a pair of friction wheels driven by the disc and movable radially on its surface by the N—S and E—W cranks, means controlled by the speed of rotation of the N—S wheel for changing the speed of rotation of the E—W wheel, a longitude indicator actuated by the E—W wheel, and a latitude indicator actuated by the N—S wheel.

3. A device for continuously indicating the position of a ship, comprising a disc rotated in proportion to the ship's speed, a crank controlled by the ship compass in proportion to the E—W component of the ship course, a second crank controlled by the ship compass in proportion to the N—S component of ship course, a pair of friction wheels driven by the disc and movable radially on its surface by the N—S and E—W cranks, a cam controlled by the rotation of the N—S wheel for varying the length of the E—W crank, and dials driven in proportion to the speed of rotation of the wheels for indicating latitude and longitude.

4. A device for continuously indicating the position of a ship, the combination of a disc driven in proportion to the ship's speed, a pair of rotatable cranks adjustable in proportion to the N—S and E—W components of the ship course, driving connections between the cranks and the ship compass, pair of wheels driven by the disc and adjustable radially thereon by the respective cranks, differential connections between the N—S wheel and the E—W crank to vary the throw of the latter, and indicators driven by the respective wheels for indicating latitude and longitude.

5. A device for continuously indicating the position of a ship, the combination of a disc driven in proportion to the ship's speed, a pair of rotatable cranks adjustable in proportion to the N—S and E—W components of the ship course, driving connections between the cranks and the ship compass, a pair of wheels driven by the disc and adjustable radially thereon by the respective cranks, a cam for varying the throw of the E—W crank, differential mechanism controlled by the rotation of the N—S wheel for actuating the cam, a latitude indicating dial driven by the N—S wheel, and a longitude indicating dial driven by the E—W wheel.

6. A device for continuously indicating the position of a ship, the combination of a disc driven in proportion to the ship's speed, a pair of rotatable cranks adjustable in proportion to the N—S and E—W components of the ship course, driving connections between the cranks and the ship compass, a pair of wheels driven by the disc and adjustable radially thereon by the respective cranks, electrical transmitters actuated by the wheels, electrical receivers driven by the transmitters, connections between the N—S receiver and the E—W receiver for varying the rate of registration of the latter in proportion to the existing indication of the former, and latitude and longitude indicating dials actuated by the respective receivers.

7. A device for continuously indicating the position of a ship, the combination of a disc driven in proportion to the ship's speed, a pair of rotatable cranks adjustable in proportion to the N—S and E—W components of the ship course, driving connections between the cranks and the ship compass, a pair of wheels driven by the disc and adjustable radially thereon by the respective cranks, a cam driven in accordance with the total revolutions of the N—S wheel for varying the effective revolutions of the E—W wheel, a latitude indicator calibrated in proportion to the effective revolutions of the N—S wheel and driven thereby, and a longitude indicator calibrated in proportion to the effective revolutions of the E—W wheel and driven thereby.

8. A device for continuously indicating the position of a ship, the combination of a disc driven in proportion to the ship's speed, a pair of rotatable cranks adjustable in proportion to the N—S and E—W components of the ship course, driving connections between the cranks and the ship compass, a pair of wheels driven by the disc and adjustable radially thereon by the respective cranks, a variable speed device controlled in proportion to the total revolutions of the N—S wheel, a latitude indicator driven in proportion to the total revolutions of the N—S wheel, a longitude indicator adapted to be driven by the E—W wheel, and connections between the variable speed device and the longitude indicator for varying the speed of the latter.

9. A device for continuously indicating the position of a ship, comprising a disc rotated in proportion to the ship's speed, members controlled by the ship compass and relatively movable on the disc so as to be driven thereby, said members being adjustable in proportion to the E—W and N—S components of the ship course, means controlled in accordance with the N—S component adjustment for modifying the adjustment of the E—W member, a longitude indicator operated by the E—W member, and a latitude indicator operated by the N—S member.

10. A device for continuously indicating the position of a ship, comprising a disc rotated in proportion to the ship's speed, members controlled by the ship compass and frictionally engaging the surface of the disc so as to be driven thereby, said members being adjustable bodily on the disc in accordance with the E—W and N—S components of the ship course, a longitude indicator connected to the E—W member for operation thereby, a latitude indicator connected to the N—S member for operation thereby, and means including a cam controlled in accordance with the N—S component adjustment operatively connected to the said connections between the disc and the said longitude indicator for modifying the indications thereof in accordance with changes in latitude of the ship.

11. A device for continuously indicating the position of a ship, comprising a disc rotated in accordance with the ship's speed, members controlled by the ship compass frictionally engaging the surface of the disc so as to be driven thereby, means for bodily adjusting said members on the disc in accordance with the N—S and E—W components of the ship course, latitude and longitude indicators, driving means operated in accordance with the speed of the N—S member and connected to the latitude indicator to operate the same, driving means operated in accordance with the speed of the E—W member and connected to the longitude indicator to operate the same, and a cam driven by said driving means first-mentioned and operable to control the speed of at least a portion of said driving connection to the longitude indicator to modify the longitude indication in accordance with changes in the latitude of the ship.

12. A device for continuously indicating the position of a ship, comprising a disc rotated in accordance with the speed of the ship, a pair of members controlled by the ship compass frictionally engaging the disc surface so as to be driven thereby, means for bodily adjusting said members on the disc in accordance with the N—S and E—W components of the ship course, latitude and longitude indicators, driving means operated in accordance with the speed of the N—S member and connected to the latitude indicator, a second disc rotated in accordance with the speed of the E—W member, a roller frictionally engaging the surface of said second disc for rotation thereby, means including a cam driven in accordance with the total revolutions of the N—S member for bodily adjusting said roller in relation to said second disc, and driving means operated in accordance with the speed of said roller for driving said longitude indicator.

ARTHUR PATTISON DAVIS.